Jan. 20, 1948. E. M. MAY 2,434,668
FLUID PRESSURE APPARATUS
Filed June 23, 1944 3 Sheets-Sheet 1

INVENTOR:
Edward M. May
By Ray A. Gehr
ATTORNEY.

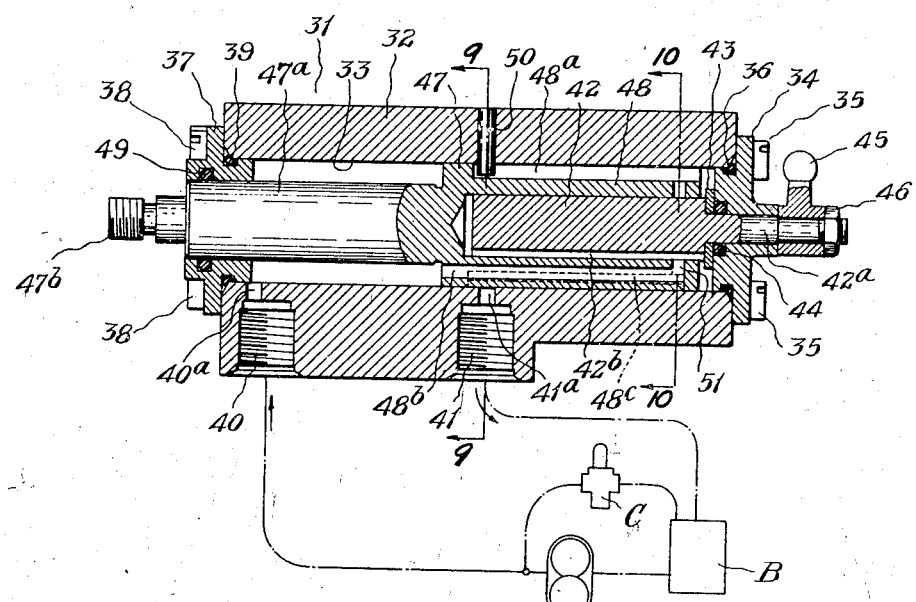
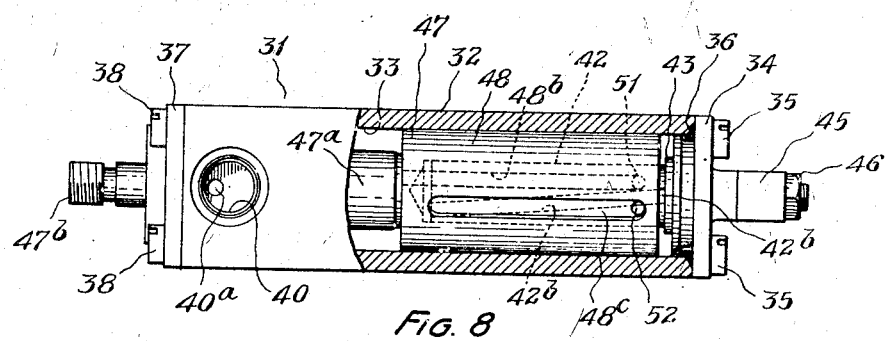
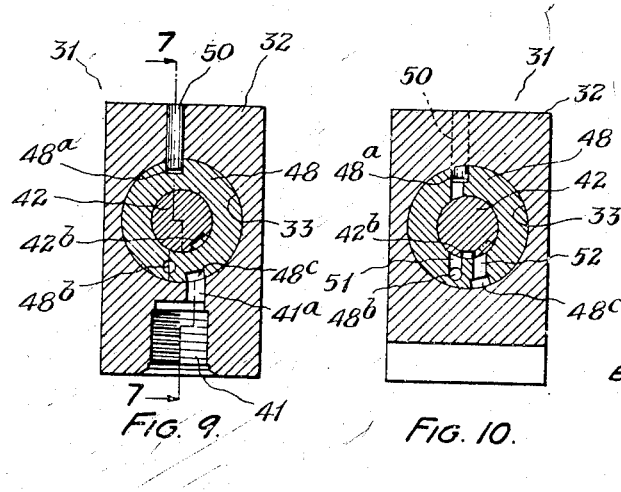
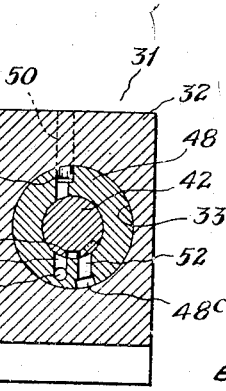

Jan. 20, 1948.  E. M. MAY  2,434,668
FLUID PRESSURE APPARATUS
Filed June 23, 1944  3 Sheets-Sheet 3

INVENTOR:
Edward M. May
BY Ray A. Gehr
ATTORNEY.

Patented Jan. 20, 1948

2,434,668

UNITED STATES PATENT OFFICE 2,434,668

FLUID PRESSURE APPARATUS

Edward M. May, Detroit, Mich.

Application June 23, 1944, Serial No. 541,823

1 Claim. (Cl. 121—41)

The invention relates to fluid pressure apparatus and is particularly applicable to hydraulic amplifiers by which a power input small as to force or as to movement or as to both force and movement can be greatly magnified or amplified to secure a large power output accurately proportional to the input or related thereto in a predetermined manner.

The object of the invention is to provide a fluid pressure amplifier which is capable of amplifying a power input with a high degree of accuracy which operates smoothly and reliably, and which is simply constructed, compact and susceptible of manufacture at relatively low cost.

With the noted objects in view the invention consists in certain forms, arrangements and combinations of parts hereinafter described in connection with the accompanying drawings showing preferred and alternative embodiments of the invention. More specifically stated, the invention consists of apparatus comprising a casing structure enclosing a working chamber and having an inlet for fluid under pressure and an outlet for discharge of fluid at reduced pressure, an input means rotatably supported by the casing structure, and an output structure mounted to reciprocate in the working chamber and having a piston section capable of transmitting (mechanically or hydraulically) output force to the exterior of the casing structure and a valve section which has a telescoping engagement with the input means, the valve section of the output structure and one of the two other means or structures having at least one set of mutually cooperating valve passages and ports to control the flow of a liquid to and from the working chamber and comprising a groove in one structure extending around and lengthwise of the axis of the valve section of the output structure and inlet and outlet ports in the other structure spaced to cooperate with the said groove in a manner such that the rotation of the input structure effects relative rotational movement between the groove and the said inlet and outlet ports and consequent power movement of the output structure. Preferably the piston section and the valve section of the output structure are separately formed and capable of relative rotational movement. Ordinarily a single set of the valve passages and ports may suffice, but one or more additional sets may be advantageous in special cases in order to secure very rapid response of the output structure to movement of the input structure.

In the drawings,

Fig. 7 is a longitudinal vertical sectional view, on the line 7—7 of Fig. 9, of another form of apparatus embodying the invention.

Fig. 8 is a bottom plan view of the apparatus shown in Fig. 7 with a portion of the casing structure broken away.

Fig. 9 is a section on the broken line 9—9 of Fig. 7.

Fig. 10 is a section on the line 10—10 of Fig. 7.

Figure 1:
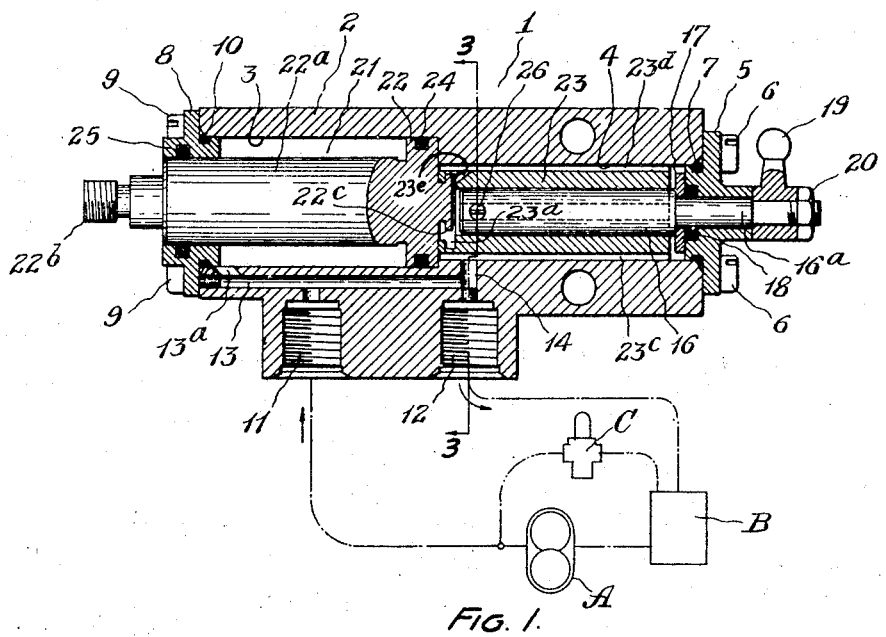
Fig. 1 is a longitudinal vertical sectional view, on the line 1—1 of Fig. 3, of apparatus embodying the invention in a preferred form, with some of the interior parts shown in elevation and with a diagrammatic indication of a fluid-pressure-generating system with which the amplifier may be used.
Figure 2:
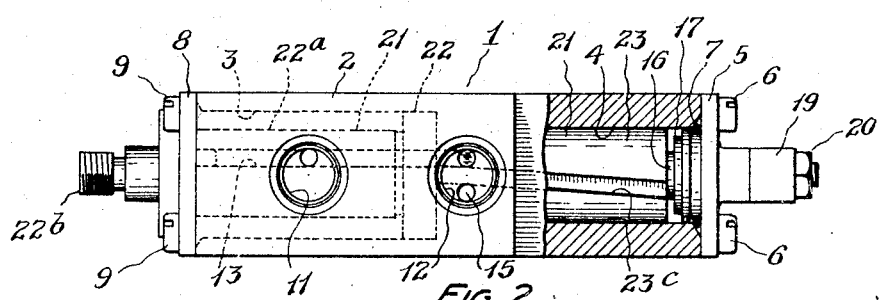
Fig. 2 is a bottom plan view of the apparatus shown in Fig. 1 with a portion of the casing structure broken away to show details of the interior construction.
Figure 3:
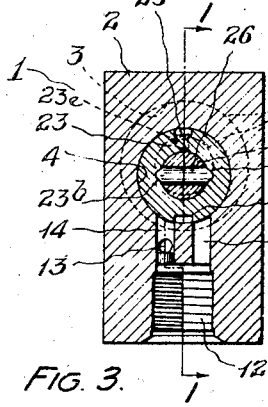
Fig. 3 is a section on the broken line 3—3 of Fig. 1.

Referring first to the apparatus shown in Figs. 1, 2 and 3, 1 designates as an entirety a casing structure comprising a main body 2 having a cylindrical bore 3 and a somewhat smaller cylindrical bore 4 with its axis parallel but eccentric to the axis of the bore 3. The right end of the bore 4 is enclosed by a head member 5 secured to the body 2 by screws 6, 6, a tight joint between the parts 2 and 5 being insured by an interposed packing 7.

The outer end of the bore 3 is similarly closed by a head 8 secured by screws 9, 9, a packing 10 being provided between the parts 2 and 8.

The body 2 of the casing structure has a fluid pressure inlet 11 internally threaded for the connection of a pipe fitting. The body 2 is also provided with a fluid outlet 12 which is internally threaded. The inlet 11 communicates with a passage 13 which extends lengthwise of the casing structure and communicates with an inlet valve port 14 that opens into the bore 4 of the casing, as shown in Figs. 1 and 3. An outlet valve port 15 which is disposed adjacent and parallel to port 14 leads from the bore 4 into the outlet 12 of the casing structure. At the left end of the bore 3 is a port 13a through which inlet fluid in passage 13 at all times has access to said bore.

The apparatus comprises an input means 16 which has a cylindrical body and a trunnion 16a which is rotatably mounted in the head 5 of the casing structure. A thrust washer 17 is disposed on the trunnion 16a between the body of the input means 16 and the head 5; and the joint between the trunnion and the casing is made tight by an annular packing 18 interposed between the head 5 and the washer 17. An actuating lever 19 is secured on the outer end of the input means by nut 20.

The apparatus also comprises an output structure designated as an entirety by the numeral 21. This structure comprises a piston section 22 and a valve section 23. The piston section 22 is fitted with a suitable hydraulic packing ring 24 and has a part 22a of reduced diameter which extends through the casing head 8, a packing ring 25 serving to provide a tight joint. The piston section is formed on its outer end 22b to facilitate the making of a driving connection between the piston and any device which is to be moved by it.

The valve section 23 of the output structure is mounted to rotate in the bore 4 of the casing structure and also to slide longitudinally therein. Section 23 is tubular in form and has its bore of a size to fit the input means 16 so as to telescope over it. The left end of the bore of the valve section 23 is somewhat enlarged and is undercut to form an annular groove 23a to cooperate with a flange 22c formed on a circular extension of the piston section 22. The diameter of flange 22c is made slightly smaller than the end of the bore of the valve section 23 so that the flange can enter the bore and be engaged with the groove 23a when the sections 22 and 23 are assembled in eccentric relation as shown in the drawing. This inter-engagement of the sections 22 and 23 causes the valve section to move endwise with the piston section without interfering with rotational movement of the section 23 about its axis in relation to the section 22.

The valve section 23 while free to reciprocate in relation to the input means 16 is held from turning in relation to it by a spline connection comprising a pin 26 which has a forced fit in the means 16 and has beveled ends which slidably fit diametrically opposite V-grooves 23b, 23b which are broached in the bore of the section 23 (Fig. 3).

Valve section 23 is formed on its under side with a helical groove 23c of a width substantially equal to the distance between the valve ports 14 and 15 (Figs. 2 and 3). The helix angle between the groove 23 and a longitudinal element of the cylindrical surface of the valve section 23 is relatively small, as shown in Fig. 2. To avoid unbalance of hydraulic pressures on the valve section 23 the latter is formed on its top side with a groove 23d of the same width as the valve groove 23c. Valve section 23 is provided with a short equalizing passage 23e between groove 23a and groove 23d to insure free telescoping movement of parts 23 and 16.

As illustrative of one way in which the apparatus can be connected and used Fig. 1 indicates diagrammatically a motor driven pump A which has its discharge connected to the inlet passage 11 of the amplifier, a low pressure receiver or sump B which is connected with the discharge passage 12 of the amplifier and a pressure limiting bypass valve C which is connected between the discharge of the pump A and the sump B.

In the operation of the amplifier the high pressure fluid entering through passage 11 always has access to the bore 3 of the casing structure and with the valve section 23 in its neutral or closed position as shown in the drawing the output structure of the device is held in its extreme right position. As force is applied to the lever 19 to rotate the input structure so that the valve groove 23c overlaps the inlet port 14, high pressure fluid is admitted into the bore 4 as well as the bore 3. As the effective fluid pressure area on the right of the output structure is considerably larger than the opposing fluid pressure area of the structure, when the high pressure fluid is admitted to the bore 4 as stated the output structure comprising piston section 22 and valve section 23 is moved to the left by the heavy unbalanced force upon it, this movement continuing until the valve groove 23c is out of register with inlet port 14. Obviously the amount of reciprocational movement of the output structure for a given rotational movement of the input structure will depend upon the helix angle of the groove 23c. With the small helix angle illustrated in the drawings a very small rotational movement of the input structure will cause a relatively large movement of the output structure. With the output structure in any particular intermediate position it can be returned to the normal position shown in the drawings by moving the lever 19 in the opposite direction thus bringing the valve groove 23c into register with the discharge port 15 and connecting the bore 4 with the low pressure side of the pressure system. Thereupon the constant high pressure on the annular left side of the piston section 22 moves the output structure to the right more or less according to the amount of rotational movement of the input means 16.

An apparatus such as is shown and described in Figs. 1, 2 and 3, when constructed with a suitable degree of accuracy, serves to amplify the force and movement of the input means of the device with a very high degree of accuracy and in amounts affording a very wide range of amplification. The device is exceedingly sensitive since a very small amount of force is required to rotate the input means 16 and the valve section 23 of the output structure. In hydraulic systems working pressures of 2000 pounds per square inch are quite common and with such a working pressure actuating the output structure it will be seen that the amplification secured may be very large. At the same time with the very slight resistance offered to movement of the input means the operation of the apparatus is exceedingly smooth and uniform. The marked simplicity of the construction, its great compactness and the resulting low production cost are readily apparent.

Figure 4:
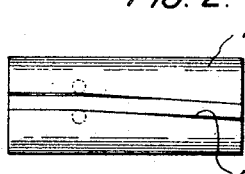
Figs. 4, 5 and 6 are bottom views of three different modified forms of the valve section of the output structure shown in Figs. 1–3.

In apparatus such as has been described the valve parts can be modified in various ways to provide correspondingly different movements of the output structure of the apparatus. For example, in Fig. 4 is shown a modification of the valve section of the output structure in which the valve section 27 has its valve groove 27a formed so that a portion of it is straight while the remainder is helical. Thus when the input structure is rotated to open the valve the output structure will move a distance corresponding to the straight portion of the groove 25a before the automatic closing of the valve ports begins.

Figure 5:
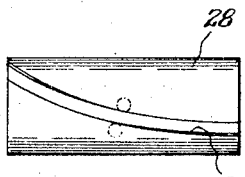

In Fig. 5 is shown still another modified form of the valve section of the output structure in which the valve section 28 has a helical groove 28a with a variable helix angle. Such a construction may be useful, for example, in a gun fire computer for introducing ballistic correction, the curve of the groove corresponding to the variations in the helix angle representing deviation from a straight line in the flight of the projectile.

Figure 6:
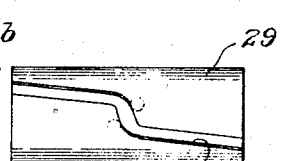
Figure 11:
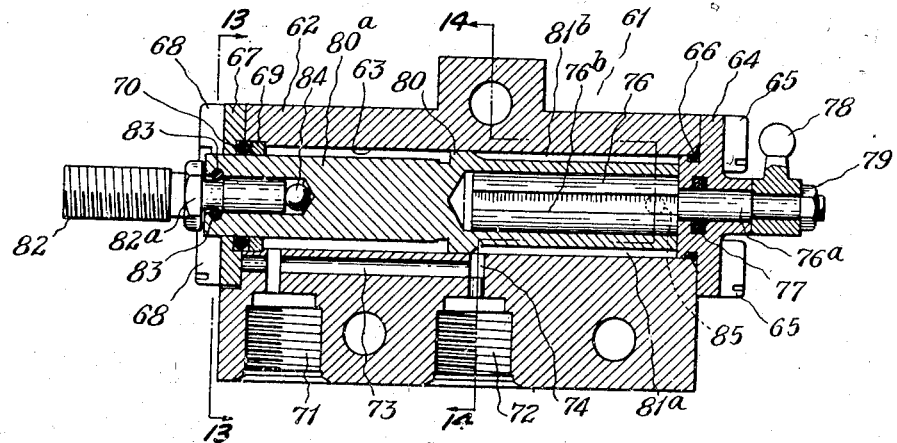
Fig. 11 is a longitudinal vertical sectional view, on the line 11—11 of Fig. 14, of still another form of construction embodying the invention.

Again, in Fig. 6 is shown still another modified form of the valve section of the output structure in which the valve section 29 has a helical valve groove 29a with an abrupt interruption of the helix intermediate its ends. This construction would be useful, for example, for the actuation of a gear shift mechanism. The first part of the valve groove would correspond to the disengaging movement of a gear, the middle part would provide a time pause, and the third part of the groove would effect engagement with another gear.

In Figs. 4, 5 and 6 the positions of the inlet and outlet ports corresponding to ports 14 and 15 in Fig. 2 are shown by dashed lines. It will readily be understood that the positioning of these ports in relation to each other is affected by changes in the form of the cooperating groove, as is shown by a comparison of Figs. 2 and 6.

The apparatus shown in Figs. 7, 8 and 9 is generally similar to that described above, the chief difference being that the cooperating valve passages and ports are formed in the input structure and the output structure instead of in the output structure and the casing structure. Another difference is that the valve section and the piston section of the output structure are formed in one piece instead of separately. Referring in detail to the construction illustrated in Figs. 7, 8 and 9, 31 designates the casing structure as an entirety, said structure comprising a main body 32 having a uniform bore 33 extending from end to end. 34 is a head or closure member secured in the right end of body 32 by means of screws 35, the joint between the parts being made tight by packing 36. The other end of the bore 33 is similarly closed by a head 37 secured by screws 38 and made tight by packing 39. The casing body 32 is formed with an internally threaded inlet passage 40 and a similar outlet passage 41. The passage 40 communicates through a port 40a with the left end of the bore 33 and the outlet passage 41 has a port 41a leading to it from the bore 33.

An input means 42 is formed with a trunnion 42a that is rotatably mounted in the head 34, a thrust washer 43 disposed on the trunnion 42a being interposed between the shouldered end of the means 42 and the inner side of the head 34 and the joint between the trunnion 42a and the head 34 being made tight by a hydraulic packing 44. An actuating lever 45 is secured on the means 42 by nut 46.

The integral output structure comprises a piston section 47 and a valve section 48. The section 47 has a reduced portion 47a which slidably fits an aperture in the head 37 of the casing structure, a hydraulic packing 49 serving to provide a tight joint between the piston part and the casing part. The piston section is formed at its end with a reduced section 47b threaded to facilitate connection with the apparatus to be actuated by the amplifier.

The valve section 48 of the output structure is formed on its upper side with a longitudinal groove 48a which slidably engages a pin 50 anchored in the casing body 32, thus preventing rotation of the output structure in relation to the casing structure. The valve section 48 has a cylindrical longitudinal bore formed to fit the exterior of the input means 42 so that the input structure can be turned in relation to the output structure and the latter can be reciprocated in relation to the former. The section 48 also has a longitudinal drilled passage 48b extending from the left side of the major diameter part of the piston section 47 to a port 51 that leads into the bore of the valve section. Adjacent the valve port 51 and parallel thereto the valve section 48 is formed with a port 52 which at its inner end communicates with the bore of the section 48 and at its outer end communicates with a longitudinal groove 48c formed in the peripheral surface of the valve section 48, the groove 48c being disposed in position to register with the outlet port 41a of the casing structure. The input means 42 is formed on its under side with a helical groove 42b having a width substantially equal to the distance between the valve ports 51 and 52 (Fig. 9).

An apparatus such as is shown in Figs. 7, 8 and 9 can be operatively connected in a hydraulic pressure system as described in connection with Figs. 1, 2 and 3 to perform substantially the same functions as the first described apparatus. In this second construction, however, the entire output structure is held against rotation in the bore of the casing and the valve action of the helical groove is secured by the relative rotation of the input means in the valve section of the output structure. Actuation of the input lever 45 in one direction causes a reciprocatory movement of the output structure to the left, while reverse movement of the lever 45 causes the right end of the bore 33 to discharge and permits the high pressure in the left end of the bore to move the output structure again to the right. The amplification of the force and movement of the input structure is similar to that secured in the first apparatus as are also the advantages of accuracy and smoothness of operation, simplicity, compactness and low cost of production.

An embodiment of the invention attaining great simplicity is illustrated in Figs. 11 to 14, inclusive. Here the casing structure, which is designated as an entirety by the numeral 61, consists of a main body 62 formed with a longitudinal bore 63 extending from end to end of the body. A closure head 64 is secured to the right end of the body by screws 65, the joint between the parts being made tight by packing 66, and a closure head 67 is similarly secured by screws 68 to the left end of the body, a thrust collar 69 and a packing ring 70 being disposed in the bore to secure a tight joint between the closure head and the body.

The casing body 62 is formed with a threaded inlet opening 71 and a similar outlet opening 72. The inlet opening 71 communicates with the left end of the bore 63 of the casing structure and also with a longitudinal drilled passage 73 which in turn connects with a valve port 74 leading into the bore 63 intermediate its ends. Adjacent and parallel to the port 74 is a port 75 which leads from the bore 63 to the outlet passage 72.

The apparatus has an input means 76 formed at one end with a trunnion 76a that is rotatably mounted in an aperture of the casing head 64, the joint between the trunnion and the head being made tight by hydraulic packing 77. An actuating lever 78 is secured on the end of the trunnion 76a by nut 79.

An integrally formed output structure is provided consisting of a piston section 80 and a valve section 81. The piston section has a reduced portion 80a which slidably engages an aperture in the head 67 of the casing, the joint between the piston section and the casing structure being made tight by the hydraulic packing 70. The piston section 80 has its end drilled out axially to receive a coupling member 82 which projects into the axial bore and has a swiveling connection formed by the pins 83, 83 which engage a peripheral groove 82a formed on the member 82. An anti-friction thrust ball 84 is interposed between the inner end of the connection 82 and the bore in which it fits. The reason for the swiveling connection will later be noted.

Figure 12:
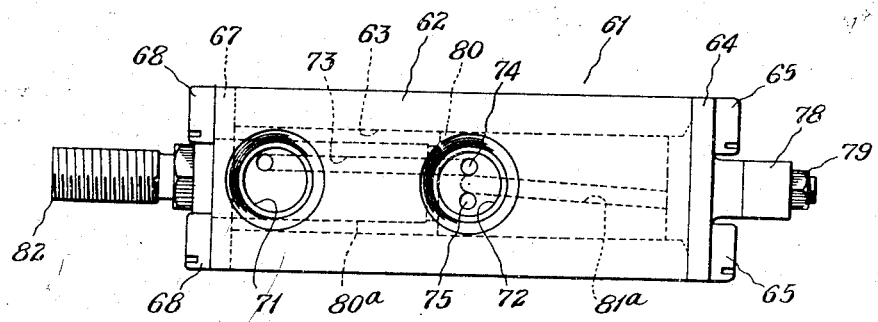
Fig. 12 is a bottom plan view of the apparatus shown in Fig. 11.
Figures 13, 14:
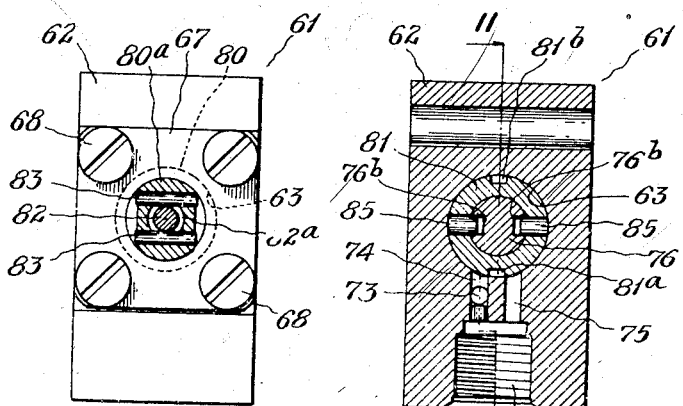
Fig. 13 is a section on the line 13—13 of Fig. 11.
Fig. 14 is a section on the broken line 14—14 of Fig. 11.

The valve section 81 of the output structure is bored out to fit over the body of the input means 76 with freedom to move longitudinally in relation to the input means but is held against rotation in relation to the input means by pins 85, 85 anchored in the valve section and slidably engaging straight longitudinal grooves 76b formed in the body of the input member 76. Grooves 76b provide passageways for liquid from end to end of the input means 76 and prevent interference with the mutual telescoping movement of parts 76 and 81, just as do the grooves 23b in the first described construction. The lower side of the valve section 81 is formed with a helical groove 81a whose width is equal to the distance between the inlet valve port 74 and the outlet port 75, as shown in Figs. 12 and 14. To secure hydraulic balance a longitudinal groove 81b is formed in the top side of the valve section 81 opposite the helical groove 81a.

It will be understood that the last described form of construction can be connected up in hydraulic systems as previously described and used for the same functions as the two other forms of apparatus. In this construction, great simplicity is secured by forming the valve section and the piston section of the output structure in one piece and mounting it for both rotation and reciprocation in the casing structure. However, this type of construction essentially involves the rotation of the piston section of the output structure as well as the valve section thereof and it therefore becomes desirable to provide the swivel connecting device 82 for connecting the output structure to the part or apparatus to be actuated. Furthermore, since both the input structure and the output structure must be hydraulically packed, somewhat more force is required to rotate the input structure than in the other two types of construction which have been described.

Apart from the considerations last referred to in connection with the third form of construction, all three forms which have been shown and described possess the advantages more fully pointed out in connection with the construction first described.

It will be understood that the embodiments of the invention which are shown and described are presented for the purpose of explanation and illustration and that the invention is susceptible of embodiment in other forms of construction within the bounds of the appended claim.

What is claimed is:

In fluid pressure power apparatus, the combination of a casing structure enclosing a working chamber and having an inlet for fluid under pressure and an outlet for the discharge of fluid of reduced pressure, an input means rotatably supported by the casing structure, an output structure mounted to reciprocate in the working chamber and comprising a piston section and a separately formed valve section operatively connected to the piston section to rotate in relation thereto and reciprocate in unison therewith and operatively connected to the input means to telescopically engage therewith without rotation in relation thereto, the valve section of the output structure and the casing structure having cooperating valve ports and passages comprising a groove in one of the two structures extending around and lengthwise of the axis of the valve section of the output structure and inlet and outlet ports in the other of the two structures spaced to cooperate with the said groove and communicating, respectively, with the inlet and the outlet of the casing structure, whereby rotation of the input structure effects relative rotational movement between the groove and the said inlet and outlet ports and consequent power movement of the output structure.

EDWARD M. MAY.

REFERENCES CITED

The following references are of record in the file of this patent:

UNITED STATES PATENTS

| Number | Name | Date |
| --- | --- | --- |
| 1,484,030 | Kitchen | Feb. 19, 1924 |
| 1,822,667 | Proell | Sept. 8, 1931 |
| 2,114,005 | Tyler | Apr. 12, 1938 |
| 2,243,603 | MacMillin | May 27, 1941 |
| 2,244,296 | Heinrich | June 3, 1941 |
| 2,324,750 | Wiedmann | July 20, 1943 |
| 2,345,563 | Alcorn | Apr. 4, 1944 |